United States Patent
Funamoto et al.

[11] Patent Number: 5,911,006
[45] Date of Patent: Jun. 8, 1999

[54] METHOD AND APPARATUS FOR CONTROLLING A QUANTITY OF CODES REPRESENTATIVE OF IMAGE DATA

[75] Inventors: Kenji Funamoto; Kenji Ito, both of Asaka, Japan

[73] Assignee: Fuji Photo Film Co., Ltd., Kanagawa, Japan

[21] Appl. No.: 08/906,698

[22] Filed: Aug. 6, 1997

[30] Foreign Application Priority Data

Aug. 14, 1996 [JP] Japan .................................. 8-214700

[51] Int. Cl.$^6$ ..................................................... G06K 9/36
[52] U.S. Cl. ......................... 382/232; 382/239; 382/248; 348/403; 348/404
[58] Field of Search .................................. 382/232–234, 382/239, 246, 248–253, 298–299, 258–259; 348/403–406, 419–420; 358/432, 433, 261.2, 426, 427

[56] References Cited

U.S. PATENT DOCUMENTS 5,086,488  2/1992  Kato et al. .............................. 382/239
5,732,156  3/1998  Watanabe et al. ....................... 382/239

FOREIGN PATENT DOCUMENTS

A2-100487  4/1990  Japan .............................. H04N 7/133
A2-104180  4/1990  Japan .............................. H04N 7/133

OTHER PUBLICATIONS

W. Chen, "Scene Adaptive Coder", IEEE, Trans. on Comm. vol. Com–32, No. 3, pp. 225–232, (Mar. 1984).

*Primary Examiner*—Leo H. Boudreau
*Assistant Examiner*—Ishrat Sherali

[57] ABSTRACT

A method and an apparatus for controlling the quantity of codes representative of image data are disclosed. Image data representative of a single scene are thinned and then subjected to orthogonal transform in order to generate transform coefficients. The transform coefficients are normalized in accordance with the initial value of a normalization factor and then coded by compression. The quantity of the resulting codes is compared with a first target value. A value of the normalization factor corresponding to the first target value is calculated on the basis of the result of the above comparison in accordance with a relation between the normalization factor and the quantity of codes. Subsequently, the entire image data representative of a single scene are subjected to orthogonal transform, and the resulting transform coefficients are normalized by the above value of the normalization factor. The transform coefficients normalized by this normalization are coded by compression. The quantity of the resulting codes is compared with a second target value. A value of the normalization factor corresponding to the second target value is calculated on the basis of the result of the comparison using the second target value. The value corresponding to the second target value is used to repeat the normalization of the transform coefficients and coding. Such a procedure is repeated until the count of the compressed data satisfies the second target value within a preselected range.

14 Claims, 9 Drawing Sheets

METHOD AND APPARATUS FOR CONTROLLING A QUANTITY OF CODES REPRESENTATIVE OF IMAGE DATA

BACKGROUND OF THE INVENTION

1. Field of the Invention

The present invention relates to a system for controlling the quantity of codes representative of image data, e.g., a method of compressing image data by orthogonal transform coding and controlling the quantity of resulting codes to a target quantity, and an apparatus for practicing the same.

2. Description of the Background Art

One of conventional systems for controlling the quantity of codes representative of image data divides a single scene of image data into a plurality of blocks, executes orthogonal transform with the image data block by block so as to produce transform coefficients, normalizes the transform coefficients by dividing them by an adequate normalization factor, rounds off the fractions of the resulting quotients for quantization, and codes the quantized values to thereby output compressed data. This kind of control system is disclosed in, e.g., Chen "Scene Adaptive Coder", IEEE Trans. on Comm. Vol. COM-32, No. 3, March 1984, pp. 225–232. To limit the compressed data to a desired target quantity of codes, the system taught in the above document monitors an output buffer temporarily storing the compressed data and changes the normalization factor in accordance with the quantity of codes stored in the buffer. For example, Japanese patent laid-open publication No. 104180/1990 teaches a system which counts, among one scene of image data, the codes of a representative block, selects, based on the resulting count, a particular normalization factor confining the compressed data to a desired target quantity of codes, and repeats such a procedure so as to limit the compressed data to a target quantity. However, the problem with the representative block scheme is that the quantity of codes depends on how the representative block is selected.

Japanese patent laid-open publication No. 10048711990 proposes a so-called feedback system which transforms one scene of image data to transform coefficients by orthogonal transform, normalizes and quantizes the transform coefficients by using a certain normalization factor and repeats, if the quantity of codes is not confined to a target value, the above procedure with another normalization factor. This kind of simple feedback scheme, however, has a drawback that feedback must be repeated a number of times until compressed data satisfying the target quantity have been achieved, consuming a substantial period of time, as will be described specifically later.

SUMMARY OF THE INVENTION

It is therefore an object of the present invention to provide a feedback type method capable of controlling the quantity of codes representative of image data in a short period of time, and an apparatus for the same.

It is another object of the present invention to provide a method capable of achieving any desired target quantity of codes, particularly even when the compression rate is low, and an apparatus for the same.

A device for controlling the quantity of codes representative of image data of the present invention includes a first storage for storing image data representative of a single scene. An orthogonal transforming section is connected to the first storage for executing orthogonal transform with the image data to thereby output transform coefficients. A normalizing section is connected to the orthogonal transforming section for normalizing the transform coefficients in accordance with a value of a normalization factor to thereby output normalized transform coefficients. A coding section is connected to the normalizing section for coding the normalized transform coefficients by compression to thereby output compressed data. A counter is connected to the output of the coding section for counting the quantity of codes of the compressed data to thereby output a count. A controller causes the first storage, orthogonal transforming section, normalizing section, coding section and counter to perform orthogonal transform, normalization and compression, and controls, based on the count output from the counter, the quantity of codes to be output from the coding section. The controller reads the image data out of the first storage while thinning them and applying the thinned image data to the orthogonal transforming section. The orthogonal transforming section subjects the thinned image data to orthogonal transform to thereby output the transform coefficients. The controller feeds the initial value of the normalization factor to the normalizing section. The normalizing section normalizes the transform coefficients with the above initial value. The counter counts the quantity of codes of the transform coefficients output from the coding section and undergone normalization and compression. The controller compares the count output from the counter and a first target value and calculates, based on the result of comparison, a value of the normalization factor corresponding to the first target value in accordance with a relation between the normalization factor and the quantity of codes. The controller feeds the calculated value of the normalization factor to the normalizing section. Subsequently, the controller reads the entire image data representative of a single scene out of the first storage while delivering them to the orthogonal transforming section, causes the first storage, orthogonal transforming section, normalizing section, coding section and counter to execute the orthogonal transform, normalization and compression with the one scene of image data read out of the first storage, compares the count output from the counter and a second target value, and repeatedly calculates the value of the normalization factor to thereby repeat the normalization, compression, counting of code and calculation of the normalization factor until the count satisfies the second target value within a preselected range.

A method of controlling the quantity of codes representative of image data of the present invention includes a step of thinning image data representative of a single scene to thereby output thinned image data, and subjecting the thinned image data to orthogonal transform to thereby generate transform coefficients. The transform coefficients are normalized in accordance with the initial value of a normalization factor to thereby output normalized transform coefficients. The normalized transform coefficients are coded by compression to thereby output compressed data. The quantity of codes of the compressed data are counted to thereby output a count. The count and a first target value are compared, and a value of the normalization factor corresponding to said first target value is calculated on the basis of the result of comparison in accordance with a relation between the normalization factor and the quantity of codes. The entire image data representative of a single scene are subjected to orthogonal transform to thereby output transform coefficients. The transform coefficients are normalized by the value of the normalization factor to thereby output normalized transform coefficients. The normalized transform coefficients are coded by compression. The quantity of codes of such normalized coefficients are counted to thereby output a count. The count output and a second target value are compared, and a value of the normalization factor corresponding to the second target value is calculated on the basis of the result of the above comparison in accordance with a relation between the normalization factor and the quantity of codes. The second normalizing step through the second calculating step are repeated until the count in the second calculating step satisfies the second target value within a preselected range.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

To better understand the present invention, brief reference will be made to the conventional feedback type system for controlling the quantity of codes taught in Japanese patent laid-open publication No. 100487/1990 mentioned earlier. The feedback system has a problem that the convergence of the quantity of codes to a target quantity and therefore the number of times of feedback is dependent on a normalization factor selected for the first path, as follows.

Figure 8:
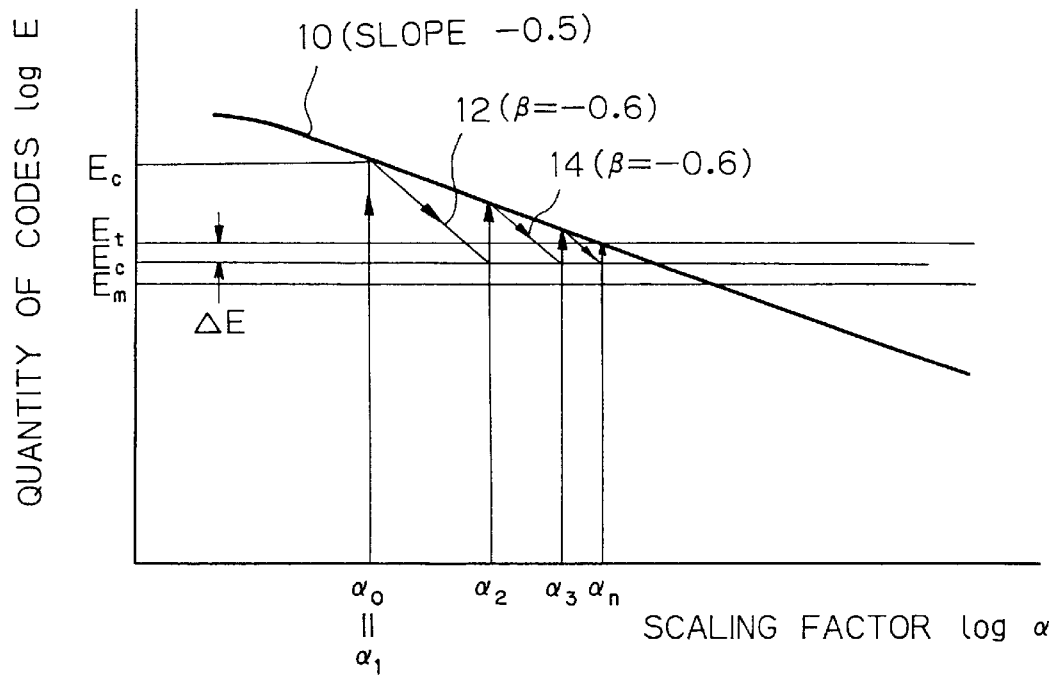
FIG. 8 is a graph plotting an approximate relation between the scaling factor and the quantity of codes with respect to image data representative of a specific pattern for describing the convergence of the scaling factor.

FIG. 8 shows a line 10 representative of a specific relation between a scaling factor $\alpha$ and a quantity of codes E representative of compressed data; a normalization factor table is multiplied by the scaling factor $\alpha$ at the time of normalization of transform coefficients. As shown, the quantity E generally varies approximately linearly relative to the scaling factor $\alpha$ in a log-log memory. Assume that for an image representative of a certain pattern, the above scaling factor versus quantity of codes line 10 has a slope of −0.5, as illustrated. Further, assume that the value $\alpha_1$ of the scaling factor $\alpha$ is given an initial value $\alpha_0$, and that the transform coefficients of the above image are normalized by the value $\alpha_0$. Then, the quantity of the resulting codes is $E_1$ lying on the line 10. It is known by experience that the scaling factor versus quantity of codes relation varies, in many cases, linearly with a slope $\beta$ of −0.6. Therefore, when a scaling factor satisfying a target quantity of codes $E_c$ is calculated along a line 12 whose slope $\beta$ is −0.6, there is produced a value $\alpha_2$. The value $\alpha_2$ is used to again calculate a scaling factor a satisfying the target quantity $E_c$ in accordance with a line 14 whose slope $\beta$ is −0.6, thereby producing a value $\alpha_3$. In this manner, normalization is repeated in accordance with the line 14 while sequentially replacing the scaling factor $\alpha$ satisfying the target quantity $E_c$. Consequently, a scaling factor $\alpha$ satisfying the target quantity $E_c$ within an allowable range of $\pm \Delta E$ is obtained on the line 10. The normalization factor table is corrected by the scaling factor $\alpha_n$, and then the transform coefficients are quantized by use of the corrected table. As a result, compressed data are produced in a quantity not exceeding the target quantity $E_c$.

Figure 9:
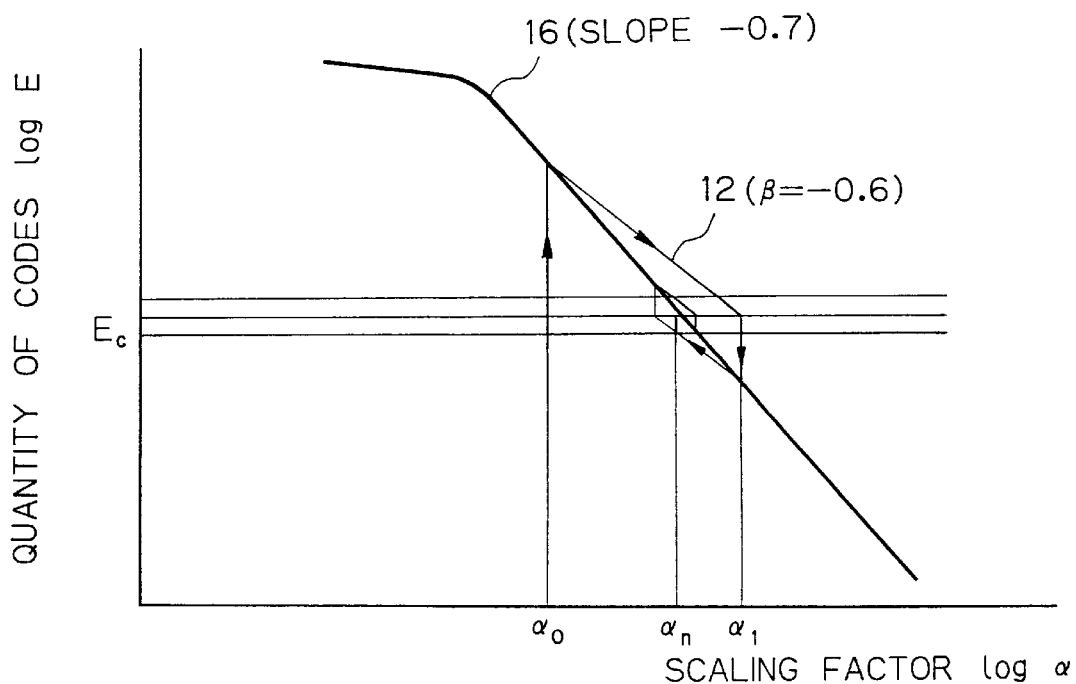
FIG. 9 is a graph similar to FIG. 8, plotting the above relation by approximation for describing the convergence of a scaling factor particular to a conventional technology.

As stated above, with the conventional feedback system, the normalization factor cannot be corrected unless the feedback involving the calculation of a scaling factor and normalization is repeated a number of times. This is particularly true when the image is of the kind needing a low compression ratio, i.e., a pattern whose relation between the scaling factor and the quantity of codes is represented by a line having a sharp slope. For example, as shown in FIG. 9, assume that a given pattern has a slope of −0.7, and that the scaling factor $\alpha$ satisfying the target quantity $E_c$ is calculated in accordance with the line 12 whose slope $\beta$ is −0.6 in the manner described above. Then, the feedback must be repeated a prohibitive number of times. Consequently, a long period of time is necessary for the feedback system to produce compressed data satisfying the desired quantity of codes.

Figure 1:
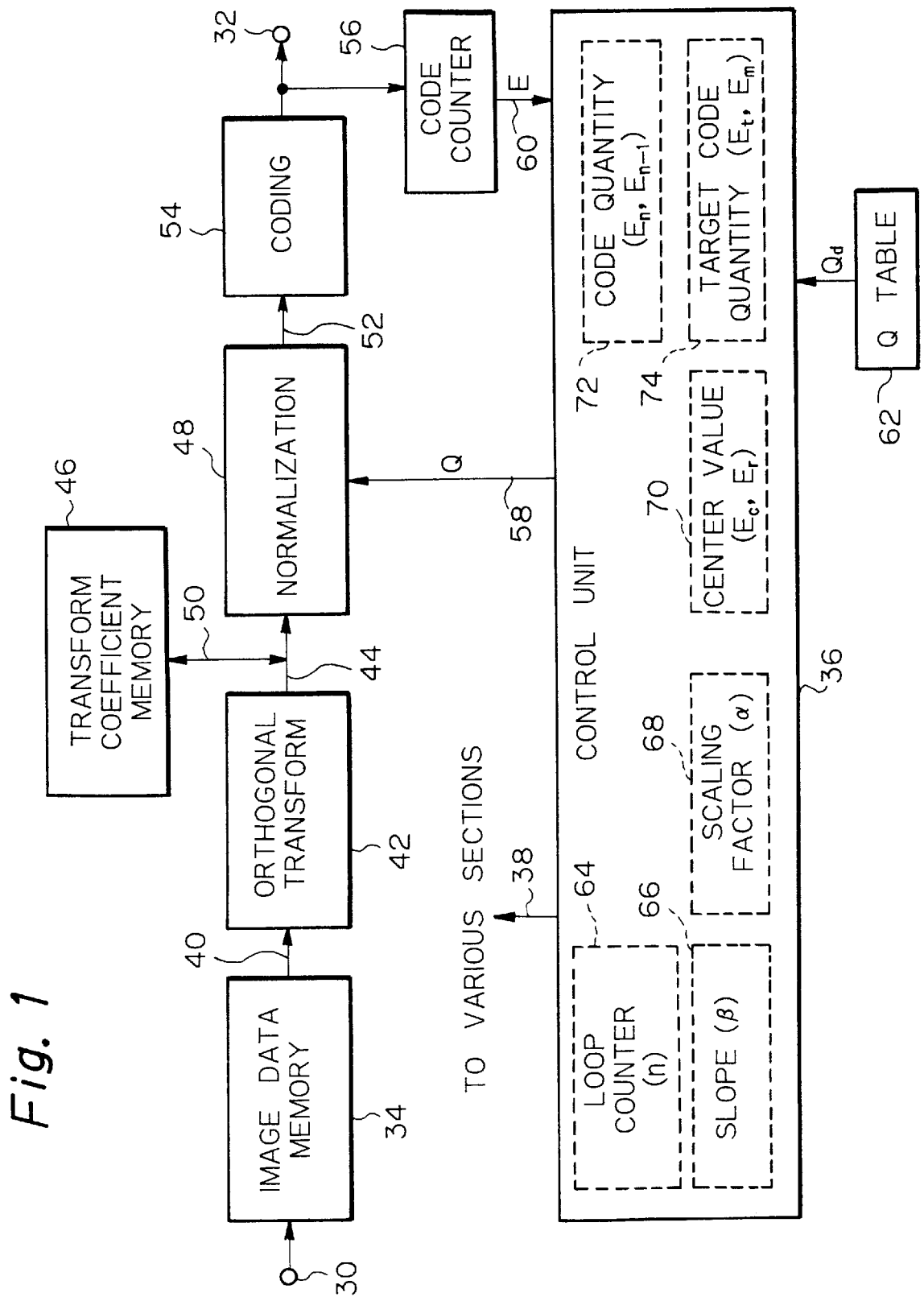
FIG. 1 is a block diagram schematically showing a code quantity control device embodying the present invention.

Referring to FIG. 1, an image data compression coder incorporating a code quantity control device embodying the present invention is shown. As shown, the coder receives image data representative of a single scene or image via an input terminal 30. Briefly, the coder divides the input image data into a plurality of blocks, executes orthogonal transform with each block of image data so as to produce transform coefficients, normalizes the transform coefficients by using an adequate normalization factor, quantizes the normalized coefficients, codes the quantized values, and then delivers the resulting codes or compressed data via an output 32. The image data arriving at the input 32 may be, but not limited to, image data representative of a single scene picked up by a solid-state imaging device and then transformed to digital data. In the illustrative embodiment, the image data are assumed to be color data representative of a color image and include luminance data (Y) and chrominance data (Q). The color image data are temporarily stored in an image data memory 34 capable of accommodating at least one scene of image data. The image data memory 34 writes the image data in its locations corresponding to addresses sequentially output from a control unit 36 which will be described later. The addresses are fed from the control unit 36 to the memory 34 via a control line 38. Also, the memory 34 reads out the image data stored therein and delivers them to an orthogonal transform 42 via its output 40.

The orthogonal transform 42 divides the image area representative of a single scene into a plurality of blocks of the same size, executes orthogonal transform with the image data block by block, and produces the resulting block-by-block transform coefficients on its output 44. In the illustrative embodiment, each block is assumed to have a size corresponding to eight pixels in the horizontal scanning direction and eight lines in the vertical direction. The orthogonal transform may advantageously be implemented by discrete cosine transform (DCT). The output 44 of the orthogonal transform 42 is connected to a transform coefficient memory 46 and a normalization 48.

The transform coefficient memory 46 stores the block-by-block transform coefficient data received from the orthogonal transform 42 temporarily therein. In addition, the memory 46 reads out the transform coefficient data block by block while outputting them via a port 50 under the control of the control unit 36. Specifically, frequency components constituting each block are sequentially read out of the memory 46 in the ascending order with respect to frequency. The transform coefficient data output from the memory 46 are fed to the normalization 48. The normalization 48 normalizes the block-by-block transform coefficient data by dividing them by an adequate normalization factor Q received from the control unit 36 via a line 58, as will be described specifically later. Subsequently, the normalization 48 rounds off the fractions of the resulting quotients. Generally, the normalization 48 executes a threshold process at the same time as or before the normalization. A threshold process refers to omitting, among the transform coefficients or frequency components other than the lowest components (DC components), i.e., AC components, the components lower than a preselected threshold. The quantized transform coefficients are fed from the output 52 of the normalization 48 to a coding 54.

The coding 54 codes the transform coefficients input via its input 52 by a redundant compression coding scheme, e.g., Huffman coding, and produces them on its output 32 in the form of compressed data. A memory device, communication circuit or similar equipment, not shown, is connected to the output 32, so the compressed data can be written to the memory device or transmitted via the communication circuit, as desired.

A code counter 56 is connected to the output 32 of the coding 54, as illustrated. Monitoring the flow of the compressed data on the output 32, the code counter 56 counts the codes representative of a single scene. The resulting count is fed from the output 60 of the counter 56 to the control unit 36 as data E representative of the total quantity of codes constituting a single scene.

The control unit, or controller as referred to hereinafter, 36 controls the operation of the entire coder and includes a processing system. For this purpose, the controller 36 is connected to the various constituent parts 34, 42, 46, 48 and 56 stated above by control lines and data lines so as to deliver commands and data to them while monitoring their statuses. Specifically, the controller 36 causes the above parts 34, 42, 46, 48 and 56 to execute orthogonal transform with the block-by-block image data constituting a single scene and coming in through the input terminal 30, to normalize and quantize the resulting transform coefficients, to code the quantized values, and to produce the resulting compressed data on the output 32. Particularly, in the illustrative embodiment, the controller 36 has a function of controlling the quantity of codes on the basis of the output E of the code counter 56, i.e., selecting a normalization factor Q allowing the actual quantity of compressed data 32 to satisfy a target quantity $E_c$.

In the illustrative embodiment, the functions of controlling the orthogonal transform and compression coding and the function of controlling the quantity of codes are implemented as a processing program sequence assigned to the controller 36. Therefore, the processing system constituting the controller 36 includes a Q table 62 listing the default values $Q_d$ of the normalization factors Q as semifixed data. The default values $Q_d$ each is prepared for one of the blocks included in a single scene, constituting a table corresponding to a single image area. In practice, the default values $Q_d$ include Q table data $Q_Y d$ for luminance data and Q table data $Q_c d$ for chrominance data. A storage area and computing elements necessary for storage program control are not directly relevant to the understanding of the present invention, and will not be described specifically.

The controller 36 further includes various registers and counters for implementing a code quantity control program sequence. The registers and counters include a loop counter (n) 64, a slope data register ($\beta$) 66, a scaling factor register ($\alpha$) 68, a center value register ($E_c$, $E_r$) 70, a code quantity register ($E_n$, $E_{n-1}$) 72, and a target code quantity register ($E_t$, $E_m$) 74, as illustrated. The loop counter 64 determines the number of times n of compression coding effected with image data constituting a single scene.

Figure 10:
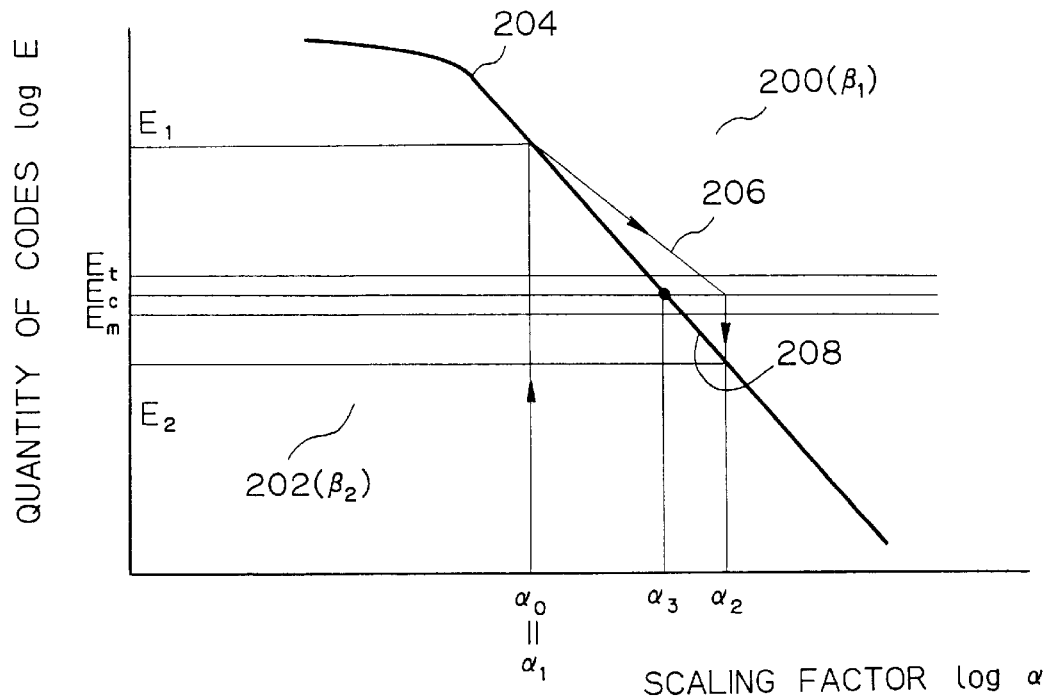
FIG. 10 is a graph similar to FIG. 8, plotting an approximate relation between the scaling factor and the quantity of codes with respect to image data representative of another specific pattern for describing the convergence of the scaling factor achievable with the illustrative embodiment.

The slope data register 66 stores data of a slope $\beta$ particular to a straight line approximating the previously stated relation between the scaling factor $\alpha$ and the quantity of codes E. In the embodiment, as shown in FIG. 10, the area in which the relation between the scaling factor $\alpha$ and the quantity of codes E is plotted is divided into two regions 200 and 202. The quantity of codes is in excess of the target quantity Ec in the region 200 while it is short of the target quantity Ec in the region 202. A preselected slope $\beta_1$ and another preselected slope $\beta_2$ greater than the slope $\beta_1$ are assigned to the regions 200 and 202, respectively. It is known by experience that as for ordinary image patterns the line representative of the relation between the scaling factor $\alpha$ and the quantity of code E has a slope $\beta$ of –0.6, as stated earlier. The embodiment therefore selects –0.6 and –0.7 for $\beta1$ and $\beta2$, respectively, as semifixed values. However, such values are not limitative, but only illustrative.

The scaling factor register 78 stores a value of the scaling factor $\alpha$ for multiplying the default value $Q_d$ read out of the Q table 62 in order to produce a normalization factor. Preferably, the register 78 should store both a scaling factor $\alpha_{n-1}$ produced during the last compression coding and the scaling factor $\alpha_n$ produced this time. The controller 36 stores a semifixed value as the initial value $\alpha_0$ of the scaling factor $\alpha$. The initial value $\alpha_0$ should advantageously be selected such that when the transform coefficients of thinned image data are normalized by the value $\alpha_0$ and then compressed, the resulting compressed data 32 are output in a quantity E exceeding a target quantity $E_r$, which will be described. For example, assume that a single scene represented by the input image data 30 has 1,300,000 pixels, and that a memory card or similar storing medium, not shown, to be connected to the output 32 of the coder has a capacity of 8,192 bits per cluster. Then, the initial value $\alpha_0$ may advantageously be, but not limited to, "100" when the compression rate is 1 bit per pixel (bpp), or "70" when it is 2 bpp, or "40" when it is 4 bpp.

The code quantity register 74 temporarily stores the actual quantity of codes E input from the code quantity counter 56. It is preferable that the register 72 stores both the quantity of codes $E_{n-1}$ output from the counter 56 during the last compression and the quantity of codes $E_n$ produced this time.

The target code quantity register 74 sets the target value $E_t$ of the quantity of codes to be delivered via the output 32, and the lower limit $E_m$ of the quantity of codes. The target value $E_t$ defines the upper limit of the quantity of codes at the same time. In the illustrative embodiment, the lower limit $E_m$ is advantageously 5% less than the target value $E_t$ for the compression rates of 1 bpp and 2 bpp or 10% less than the target value $E_t$ for the compression rate of 4 bpp. For example, as for the above specific application, the target value or upper limit $E_t$ and lower limit $E_m$ are respectively twenty clusters and nineteen clusters for the compression rate of 1 bpp, or forty clusters and thirty-eight clusters for the compression rate of 2 bpp, or eighty clusters and seventy-two clusters for the compression rate of 4 bpp. These values $E_t$ and $E_m$ are set as semifixed values or variable values.

The center value register 70 is used to set, in the embodiment, two different center values $E_c$ and $E_r$ of the allowable range of the target quantity of codes therein. The center value $E_c$ is applied to image data representative of a full or non-thinned scene. In the specific application stated earlier, the center value $E_c$ is selected to be nineteen clusters for the compression rate of 1 bpp, or thirty-nine clusters for the compression rate of 2 bpp, or seventy-six clusters for the compression rate of 4 bpp. The other center value $E_r$ is applied to thinned image data. For example, when one-fourth of the pixels of a single scene are sampled in the previous specific application, the center value $E_r$ is advantageously about one-third of the center value $E_c$, as known by experience. As for the above specific application, when one-fourth of the pixels are sampled, the center value $E_r$ is selected to be five clusters for the compression rate of 1 bpp, or eleven clusters for the compression rate of 2 bpp, or twenty-two clusters for the compression rate of 4 bpp. Theses values $E_c$ and $E_r$ are set as semifixed values or variable values. The above specific values are, of course, only illustrative.

A specific operation of the illustrative embodiment will be described with reference to FIG. 2. The controller 36 writes image data coming in through the input 30 in the image data memory 34, and initializes the system (step 100). For example, in the step 100, the controller 36 initially sets "1" in the loop counter 64 as the count n, and clears the slope data register 66, scaling factor register 68 and code quantity register 72 to their initial values, e.g., zero. In the following description, signals and data will be designated by the reference numerals attached to the connection lines or the blocks on which they appear. When the image data stored in the image data memory 34 are to be compressed for the first time, i.e., when the count n of the loop counter 64 is "1" (YES, step 102), the controller 36 generates addresses designating the memory locations of the memory 34 at intervals, divides a single scene of image data into blocks, and samples the image data while thinning them (step 104). In the embodiment, one-fourth of the pixels are sampled by thinning by way of example. Specifically, the controller 36 reads out one pixel of the image data constituting one scene, skips the next one pixel, reads out the next one pixel, and repeats such a procedure until it reads out one row of pixel data. Thereafter, the controller 36 skips the next one row of image data, and then repeats the above sampling procedure with the next one row of image data. As a result, one-fourth of the pixels are sampled with the other pixels simply skipped. The resulting thinned image data are fed to the orthogonal transform 42 via the connection line 40. It should be noted that the present invention is, of course, practicable with any other sampling rate.

Figure 4:
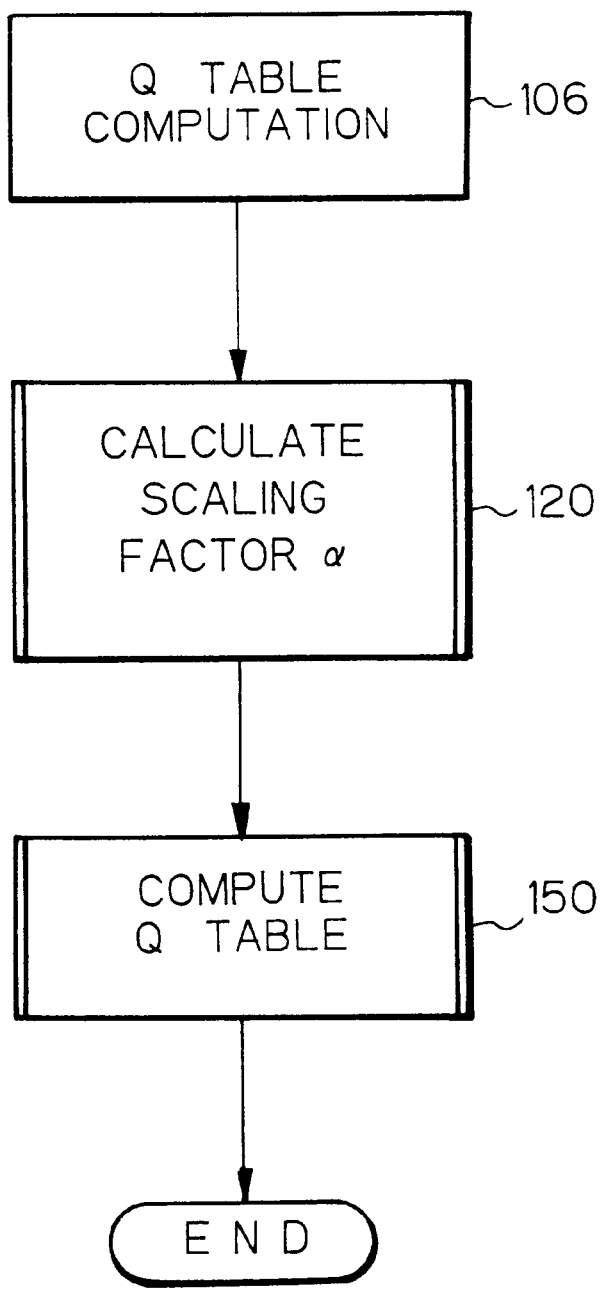
FIG. 4 is a flowchart representative of a specific routine included in FIG. 3 for determining a Q table.
Figure 5:
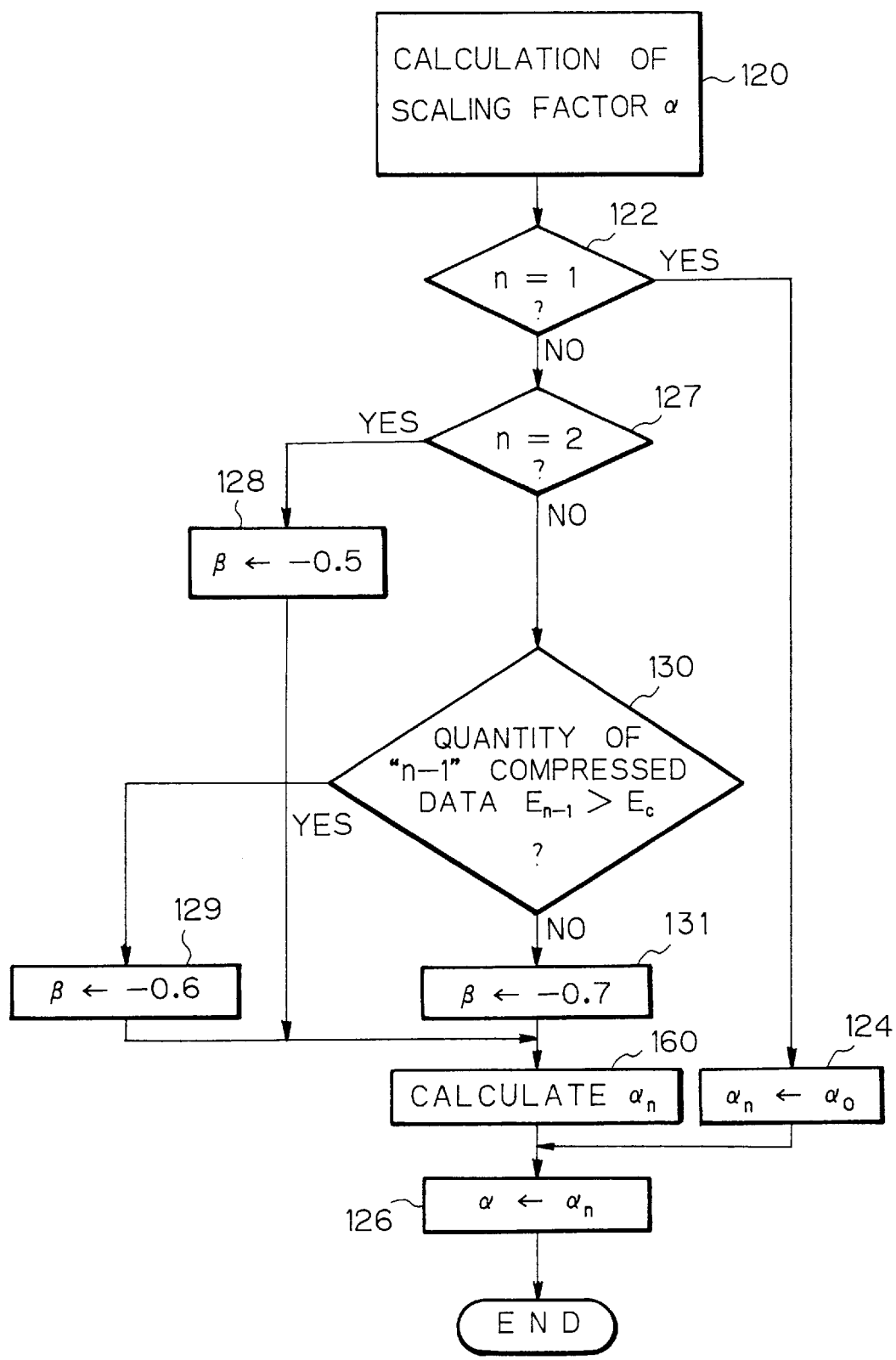
FIG. 5 is a flowchart similar to FIG. 4, showing a subroutine for determining a scaling factor and included in FIG. 4.

While executing the sampling step 104, the controller 36 executes a step 106 for determining a normalization factor Q (Q table determining process). As shown in FIG. 4, the Q table determining process 106 consists of two subroutines 120 and 150. First, the controller 36 determines a scaling factor α for quantization (step 120), and then computes a Q table (step 150). FIG. 5 shows the subroutine 120 in detail. As shown, in the case of thinned image data, the count n of the loop counter 64 is "1" (YES, step 122). Therefore, the controller 36 selects the initial value $α_0$ as the current scaling factor $α_1$ (step 124), and sets it in the scaling factor register 68 (step 126). Thereafter, the controller 36 ends the subroutine 120 and returns to the Q table computing step 150 shown in FIG. 4.

Figure 7:
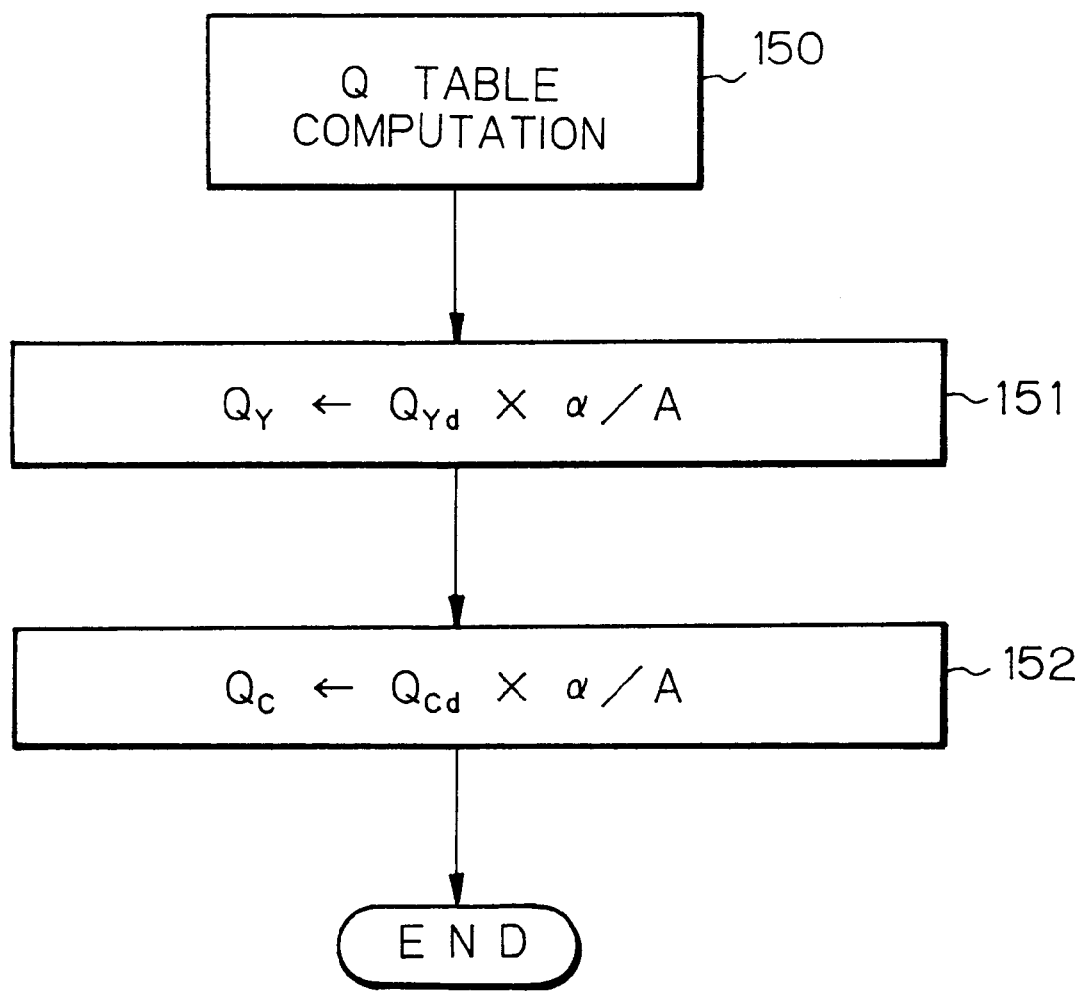
FIG. 7 is a flowchart similar to FIG. 4, showing a specific subroutine for computing a Q table and included in FIG. 4.

As shown in FIG. 7, in the step 150, the controller 36 reads the default value Qd of a normalization factor out of the Q table 62, multiplies the default value Qd by the scaling factor α stored in the scaling factor register 68, and then divides the resulting product by a constant A to thereby produce a normalization coefficient Q to be actually used. At this stage of processing, the scaling factor α is of the initial value $α_0$. More specifically, in a step 151, the controller 36 multiplies the default value $Q_Y d$ of a normalization factor for luminance data by the scaling factor $α_0$, and divides the resulting product by the constant A so as to produce a normalization factor $Q_Y$ for luminance data. Subsequently, in a step 152, the controller 36 multiplies the default value $Q_c d$ of a normalization factor for chrominance data by the scaling factor $α_0$, and divides the resulting product by the constant A so as to produce a normalization factor $Q_c$ for chrominance data. These steps 151 and 152 may be executed in the reverse order, if desired. After the step 150, the program advances to a step 107 shown in FIG. 2.

Dividing the products by the constant A in the steps 151 and 152 is significant in the following respect. The scaling factor α versus quantity of codes E relation is approximated by a straight line in a log-log memory, as stated previously. It follows that as the scaling factor α decreases, the range over which the quantity of codes E varies increases. Stated another way, the fitting ratio of normalization coefficients around the target quantity of codes decreases with a decrease in compression rate. In light of this, it is preferable to vary the constant A in accordance with the target quantity of codes Et so as to increase the accuracy of fractions below the decimal point. This successfully enhances the hitting accuracy of the scaling factor α. In the previously stated specific application, the constant A may advantageously be, but not limited to, "256" for the compression rate of 1 bpp, or "512" for the compression rate of 2 bpp, or "1,024" for the compression rate of 4 bpp. In this manner, the illustrative embodiment reduces the range of normalization factors around the target quantity of codes when the compression rate is low, thereby enhancing the accuracy and facilitating the convergence of the system.

Figure 2:
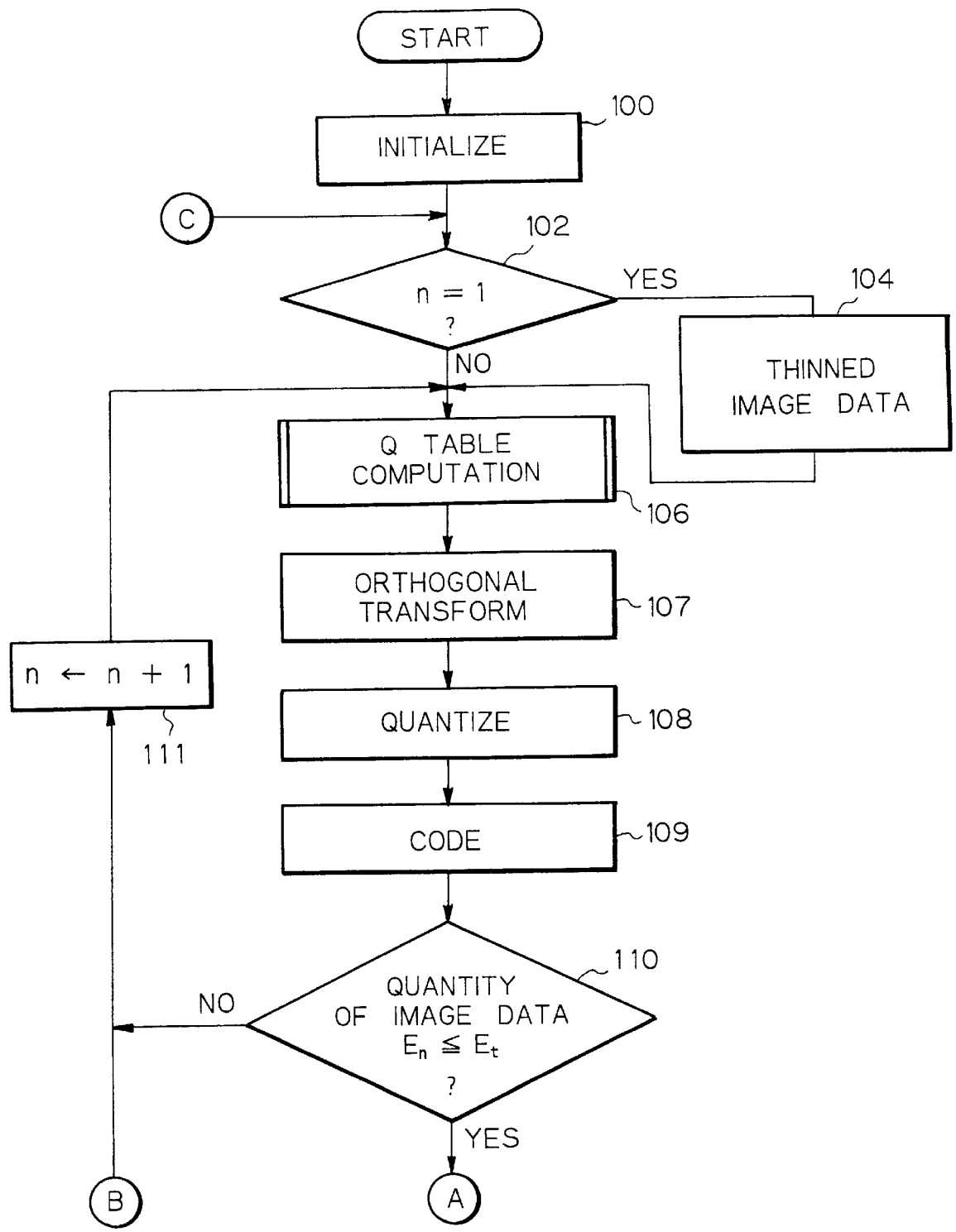
FIG. 2 is a flowchart demonstrating a specific operation of a controller included in the embodiment.

In the step 107 shown in FIG. 2, the orthogonal transform 42 executes orthogonal transform with the thinned image data 40 block by block under the control of the controller 36. The resulting transform coefficient data 44 are written to the transform coefficient memory 46. The controller 36 sets the normalization factor Q (QY and QC) produced by the procedure of FIG. 7 in the normalization 48 via the connection line 58. The controller 36 sequentially reads, block by block, the transform coefficient data or AC components out of the memory 46 in the ascending order with respect to frequency, while delivering them to the normalization 48. In response, the normalization 48 divides each block of transform coefficient data by the normalization factor Q assigned to the block, rounds off the resulting quotient, and then performs thresholding, thereby normalizing and quantizing the transform coefficient data (step S108). The quantized transform coefficients 52 are fed to the coding 54.

The coding 54 codes the transform coefficients applied to its input 52 and outputs corresponding codes as compressed data 32 (step 109). However, the codes 32 are not used by the equipment at this stage of operation. The code quantity counter 56, monitoring the flow of the compressed data on the output 32, counts the codes. The count of the counter 56 is delivered to the controller 36 as data E representative of the total quantity of codes constituting a single scene.

Figure 3:
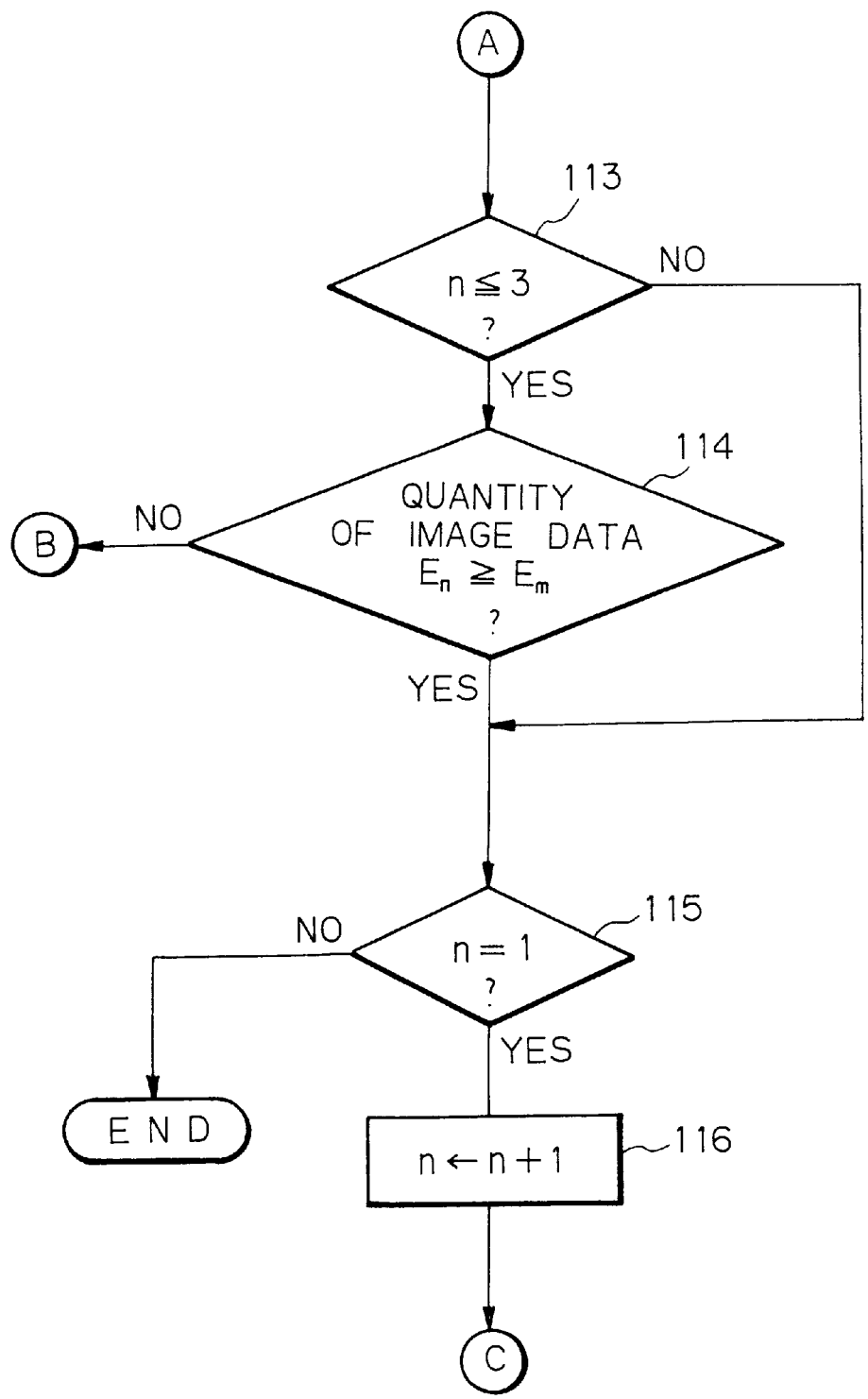
FIG. 3 is a flowchart showing processing associated with FIG. 2.

The controller 36 writes the total quantity of codes E in its code quantity register 72. At this instant, the controller 36 converts the quantity of codes E derived from the thinned image data into a quantity of codes $E_1$ corresponding to a full scene. Then, the controller 36 compares the quantity $E_1$ with the target quantity $E_t$ stored in the target quantity register 74 (step 110). If the actual quantity $E_1$ is not greater than the target quantity $E_t$ (YES, step 110), the operation is transferred to a sequence of steps shown in FIG. 3, as indicated by a jump mark A. In FIG. 3, the controller 36 determines whether or not the count n of the loop counter 64 is smaller than or equal to "3" (step 113). Because the count n is "1" at this stage of processing (YES, step 113), the controller 36 compares the converted total quantity of codes $E_n$, i.e., $E_1$ with the lower limit $E_m$ (step 114). Assume that the quantity $E_1$ is greater than or equal to the lower limit $E_m$ (YES, step 114), meaning that the current scaling factor $\alpha_0$ is adequate. Then, the controller 36 determines whether or not the count n is "1" (step 115). Because the answer of the step 115 is YES at this stage, the controller 36 increments the loop counter 64 by 1 (one) (step 116) and then returns to the step 102, FIG. 2, as indicated by a transfer letter C. As a result, the above scaling factor $\alpha_0$ is applied also to a true coding procedure which will be described.

In the illustrative embodiment, the total quantity of codes E derived from the thinned image data are converted into full-scene image data and then compared with the full-scene target values $E_t$ and $E_r$ in the steps 110 and 114. Alternatively, exclusive target values for thinned image data may be used and assigned to the quantity of thinned image data E. In the specific application sampling one-fourth of the image data, the target values for thinned image data may each be about one-third of the target value $E_t$ or $E_r$ assigned to full-scene image data.

If the converted quantity of codes $E_1$ is greater than the target quantity $E_t$ (NO, step 110), the controller 36 increments the count n of the loop counter 64 to "2" and then returns to the Q table determining routine 106 (step 111). This is also true when the quantity of code $E_1$ is smaller than the lower limit $E_m$ (NO, step 114).

When the controller 36 incremented the loop counter 64 to "2" executes the routine 106 again, the control advances, in the subroutine 120, from the step 122 to a step 128 via the step 127. In the step 128, the controller 36 sets a slope $\beta_3$ in the slope register 66 and then executes a subroutine 160. In the embodiment, the slope $\beta_3$ is selected to be −0.5. This is because the slope of the line representative of the relation between the scaling factor α and the quantity of codes E is, in many cases, more gentle with a thinned image than with an original or full image, as known by experience.

The subroutine 106 is a sequence for calculating a scaling factor $a_n$, as will be described with reference to FIG. 6. As shown, because the count n of the loop counter 64 has been updated to "2" (YES, step 162), the controller 36 calculates a scaling factor $\alpha_2$ to be used next (step 163). The scaling factor $\alpha_1$ presently stored in the scaling factor register 68 is $\alpha_0$ (initial value), as stated earlier. Also, the slope $\beta_1$ assigned to the region 200 is held in the slope register 66, as also sated previously. Therefore, in the step 163, the controller 36 produces the scaling factor $\alpha_2$ by using the values $\alpha_1$ and $\beta_1$, the value $E_1$ held in the code quantity register 72, and the center value $E_r$ stored in the center value register 70 and assigned to thinned image data, as follows.

Figure 6:
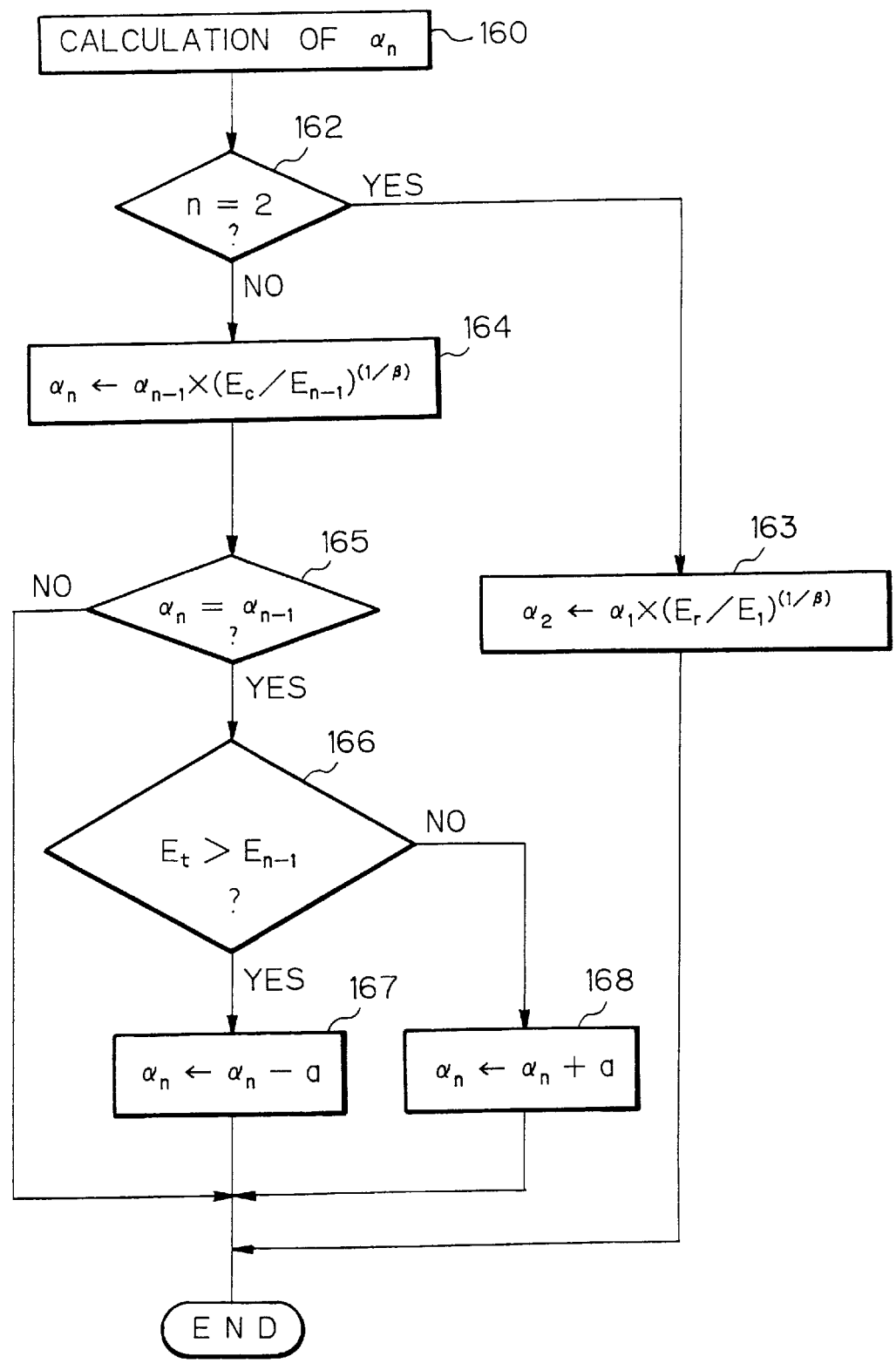
FIG. 6 is a flowchart similar to FIG. 4, showing a specific subroutine for calculating a scaling factor and included in FIG. 5.

The step 163 shown in FIG. 6 is followed by the step 126 shown in FIG. 5. In the step 126, the controller 36 sets the scaling factor $\alpha_2$ in the scaling factor register 68. Subsequently, the controller 36 again executes the Q table computing step 150, FIG. 4, with the scaling factor $\alpha_2$ stored in the scaling factor register 68. Then, the controller 36 sets the resulting new normalization factor $Q_2$ in the normalization 48.

To summarize the procedure described so far, assume that the input image data 30 are representative of an image pattern whose characteristic lies on a line 204 shown in FIG. 10. The line 204 is representative of a relation between the scaling factor α and the quantity of codes E and having a slope of −0.7. Then, when such image data are thinned, subjected to orthogonal transform, and then normalized by use of the original scaling factor $\alpha_0$, codes are output in the converted quantity $E_1$ on the line 204. Because the quantity $E_1$ is above the target quantity $E_t$, the scaling factor $\alpha_2$ for the next coding procedure is calculated in accordance with a line 206 having a slope $\beta_1$ of −0.6. A normalization factor $Q_2$ corresponding to the scaling factor $\alpha_2$ is set in the normalization 48.

Referring again to FIG. 2, the controller 36 executes the orthogonal transform 107, normalization and quantization 108, and coding 109 in the previously stated manner, except for the following. Because the count n of the loop counter 64 is "2" this time, the controller 36 reads the image data representative of the full scene out of the image data memory 34. Specifically, the controller 36 sequentially reads one scene of image data out of the memory 34 block by block while generating consecutive location addresses meant for the memory 34. The image data read out of the memory 34 are applied to the orthogonal transform 42. The orthogonal transform 42 executes orthogonal transform with the block-by-block image data 40 while writing the resulting block-by-block transform coefficients 44 in the transform coefficient memory 46. The controller 36 sequentially reads the block-by-block transform coefficient data, i.e., AC components out of the memory 46 in the ascending order with respect to frequency while applying them to the normalization 48 by so-called zigzag scanning. The normalization normalizes and quantizes each block of transform coefficient data with a particular normalization factor Q2 set therein. The quantized transform coefficients 42 are coded by the coding 54 and then fed out via the output 32.

The code quantity counter 56 again counts the total quantity of codes E of the compressed data 32 (step 110). The controller 36 sets the quantity E in the code quantity register 72. At this instant, the controller 36 compares the total quantity of codes $E_2$ derived from the full-scene image data with the target value $E_t$ stored in the target quantity register 74. If the actual quantity $E_2$ does not exceed the target quantity $E_t$, the controller 36 executes the decision step 113 as in the previous procedure. Because the count n of the loop counter 64 is "2" in this case, the operation is transferred to the decision step 114 for comparing the quantity $E_2$ with the lower limit $E_m$. If the value $E_n$ of the total quantity of code exceeds the lower limit $E_m$, i.e., if it is not more than 5% below the target quantity $E_t$, the current scaling factor $\alpha_2$ is determined to be adequate. In this condition, the controller 36 ends the processing because the count n of the loop counter 64 is "2" (NO, step 115). That is, the compressed data output appeared on the output 32 is of a quantity lying between the target value $E_t$ and the lower limit $E_m$.

Assume that the answer of the step 110 or that of the step 114 is NO, i.e., the actual quantity of codes $E_2$ is greater than the target quantity $E_t$ or smaller than the lower limit $E_m$. Then, in the step 111, the controller 36 increments the loop counter 64 to "3" and again returns to the routine 106. In the routine 106, the controller 36 again calculates a scaling factor $\alpha_n$ and therefore a normalization factor $Q_n$ and quantizes and codes the transform coefficients stored in the transform coefficient memory 46 with the new normalization coefficient $Q_n$.

Because the count n of the loop counter 64 is "3", the subroutine 120 shown in FIG. 5 advances from the steps 122 and 127 to a step 130. In the step 130, the controller 36 determines whether or not the quantity $E_{n-1}$ of data compressed last time is greater than the center value $E_C$. If the answer of the step 130 is NO, the controller 36 sets the preselected value $\beta_2$, i.e., −0.7 assigned to the region 202 in the slope register 66 (step 131). However, if the answer of the step 130 is YES, the controller 36 sets the other value $\beta 1$, i.e., −0.6 assigned to the region 200 in the slope register 66 (step 129).

After the above step 129, the controller 36 again executes the subroutine 160 shown in FIG. 6. Because the count n of the loop counter 64 is "3" this time (NO, step 162), the controller 36 calculates a scaling factor $\alpha_n$ to be used next, i.e., $\alpha_3$ by using the expression shown in the step 164. Specifically, the controller 36 produces a scaling factor $\alpha_n$, i.e., $\alpha_3$ for the following procedure by use of the value $\alpha_2$ stored in the scaling factor register 68, the value $\beta_1$ or $\beta_2$ stored in the slope register 66, the value $E_{n-1}$ stored in the code quantity register 72 ($E_2$ in this case), and the center value $E_c$ stored in the center value register 70 and assigned to full-scene image data.

The controller 36 determines whether or not the scaling factor $\alpha_n$ output in the step S64 is equal to the last scaling factor $\alpha_{n-1}$ (step 165). If the answer of the step 165 is NO, meaning that the scaling factor $\alpha_n$ is different from the scaling factor $\alpha_{n-1}$, the controller 36 returns to the step 125, FIG. 5, determining that the value $\alpha_n$ can be used. This is followed by the processing described previously.

If the answer of the step 165 is YES, the controller 36 slightly corrects the scaling factor $\alpha_n$ produced this time because the system might repeat the above routine, as follows. The correction depends on whether or not the target value $E_t$ is greater than the last quantity of codes $E_{n-1}$ (step 166). If the answer of the step 166 is YES, the controller 36 subtracts a preselected value $\alpha$ from the scaling factor $\alpha_n$ (step 167) and writes the resulting remainder in the scaling factor register 68 as a new scaling factor $\alpha_n$ so as to use it for the following processing. If the answer of the step 165 is NO, the controller 36 adds the preselected value $\alpha$ to the scaling factor $\alpha_n$ (step 168) and writes the resulting sum in the register 68 so as to use it for the following processing. In the previously stated specific application, the preselected value $\alpha$ may be, but not limited to, about "1". With such a correction procedure, the controller 36 successfully frees the system from oscillation or divergence. The subroutine 160 is followed by the routine 150 of FIG. 4 by way of the step 126 of FIG. 5. As a result, the new normalization coefficient $Q_n$ is set in the normalization 48. While the feedback described above is repeated, the normalization factor $Q_n$ converges toward a certain value rapidly.

The above procedure will be summarized hereinafter, taking the image data 30 described with reference to FIG. 10 as an example. A scaling factor $\alpha_2$ satisfying the range between the target quantity of codes $E_t$ and the lower limit $E_m$ is calculated in accordance with the straight line 206 having the slope $\beta_1$ of −0.6. The full-scene image data 40 are actually compressed by use of the scaling factor $\alpha_2$. Because the resulting actual quantity of codes $E_2$ is below the lower limit $E_m$, a scaling factor $\alpha$ satisfying the target quantity of codes $E_c$ is computed in accordance with the straight line 208 having the slope $\beta 2$ of −0.7. The calculated scaling factor $\alpha$ is $\alpha_3$ satisfying the range between the target quantity $E_t$ and the lower limit $E_m$, as illustrated. In the specific condition shown in FIG. 10, the line 208 is coincident with the line 204 of the actual image data 40 by chance. In this manner, normalization is repeated by sequentially updating the scaling factor $\alpha$ which satisfies, in the region 200, the range between the target quantity $E_t$ and the lower limit $E_m$ in accordance with the line 206 whose slope $\beta_1$ is −0.6 and satisfies, in the region 202, the above range in accordance with the line 208 whose slope $\beta_2$ is −0.7. Consequently, a scaling factor $\alpha_n$ satisfying the target quantity $E_c$ within the preselected allowable range of $\pm\Delta E$, FIG. 8, and lying on the line 204 is obtained. By correcting the normalization coefficient table $Q_d$ with the scaling factor $\alpha_n$ and then quantizing the transform coefficients 50, it is possible to produce compressed data not exceeding the target quantity.

Figure 11:
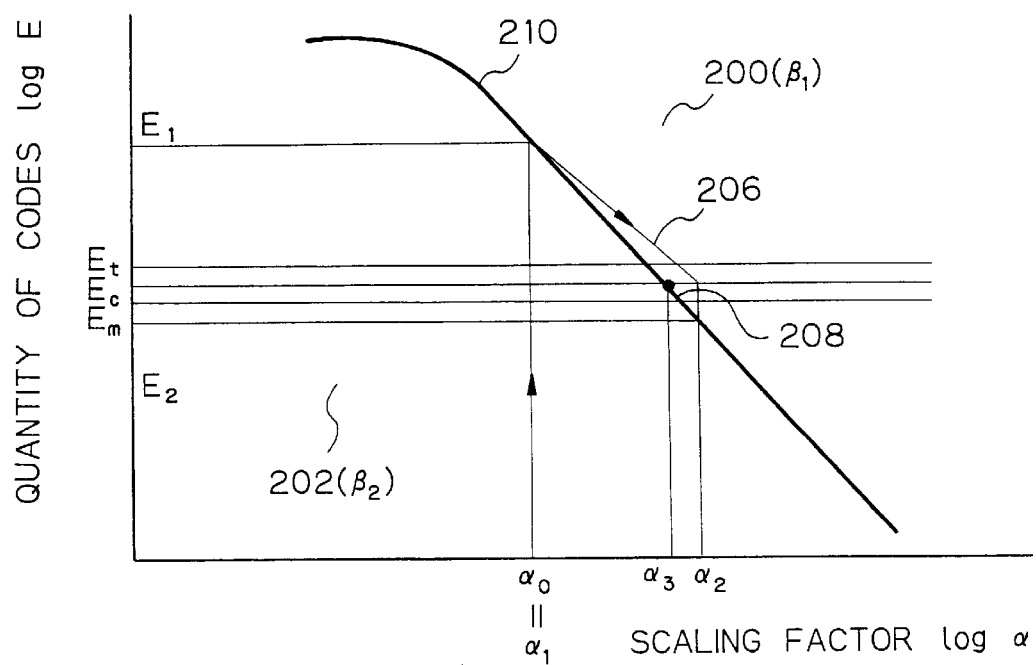
FIG. 11 is a graph similar to FIG. 8, plotting an approximate relation between the scaling factor and the quantity of codes with respect to image data representative of still another specific pattern.

As shown in FIG. 11, assume that the image pattern represented by the input image data 30 is approximated by a straight line 210 having a slope of −0.65. Even with such a pattern, the illustrative embodiment functions in the manner described above. Specifically, normalization is repeated by updating the scaling factor $\alpha$ satisfying, in the region 200, the range between the target quantity $E_t$ and the lower limit $E_m$ in accordance with the line 206 whose slope $\beta_1$ is −0.6 and satisfying, in the region 202, the above range in accordance with the line 208 whose slope $\beta_2$ is −0.7. As a result, a scaling factor $\alpha_n$ satisfying the target quantity $E_c$ within the allowable range of $\pm\Delta E$ and lying on the line 210 is achieved.

Further, assume that the image data 30 are representative of a pattern having a slope of −0.5, as indicated by a line 10 in FIG. 8. Then, the scaling factor $\alpha$ and therefore the normalization factor Q will be calculated in accordance with a straight line 12 or 14 whose slope $\beta$ is −0.6 within the region 200, FIG. 10, above the center value $E_c$ with respect to the quantity of codes.

As stated above, the illustrative embodiment executes the initial calculation of a quantity of codes by using thinned image data. For example, when one-fourth of full-scene image data are sampled for the initial calculation, the interval between the compression of such image data and the calculation of normalization factor is only about one-fourth of the interval necessary for the second and successive processing using the full-scene image data. Let the compression of the full-scene image data be a single compression sequence. Then, the conventional system described earlier needs 3.5 times of feedback on the average in producing an adequate normalization factor with ordinary image data. By contrast, assuming that the compression of the thinned image data is 0.25 time of compression sequence, then the embodiment allows the system to converge, i.e., produces an adequate normalization factor by only about two times of feedback on the average.

In summary, in accordance with the present invention, the initial calculation of an quantity of codes is effected on the basis of thinned sampled image data. In addition, as to a relation between the scaling factor and the quantity of codes, a scaling factor is calculated with a greater slope of log-log approximate line assigned to a region below a target quantity of codes than to a region above the target quantity. As a result, an adequate normalization factor for compression is achievable with a minimum number of times of feedback, noticeably reducing the period of time necessary for the system to converge. Moreover, the target quantity of codes is insured even with a low compression rate.

The entire disclosure of Japanese patent application No. 214700/1996 filed on Aug. 14, 1996 including the specification, claims, accompanying drawings and abstract of the disclosure is incorporated herein by reference in its entirely.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A device for controlling a quantity of codes representative of image data, comprising:

a first storage for storing image data representative of a single scene;

an orthogonal transforming circuit connected to said first storage for executing orthogonal transform with the image data to thereby output transform coefficients;

a normalizing circuit connected to said orthogonal transforming circuit for normalizing the transform coefficients in accordance with a value of a normalization factor to thereby output normalized transform coefficients;

a coding circuit connected to said normalizing circuit for coding the normalized transform coefficients by compression to thereby output compressed data;

a counter connected to an output of said coding circuit for counting a quantity of codes of the compressed data to thereby output a count; and a control circuit for causing said first storage, said orthogonal transforming circuit, said normalizing circuit, said coding circuit and said counter to perform orthogonal transform, normalization and compression, and controlling, based on the count output from said counter, the quantity of codes to be output from said coding circuit;

said control circuit reading the image data out of said first storage while thinning said image data and applying resulting thinned image data to said orthogonal transforming circuit, said orthogonal transforming circuit subjecting said thinned image data to orthogonal transform to thereby output the transform coefficients;

said control circuit feeding an initial value of the normalization factor to said normalizing circuit, said normalizing circuit normalizing the transform coefficients with said initial value;

said counter counting the quantity of codes of the transform coefficients output from said coding circuit and undergone normalization and compression;

said control circuit comparing the count output from said counter and a first target value and calculating, based on a result of comparison, a value of the normalization factor corresponding to said first target value in accordance with a relation between the normalization factor and the quantity of codes;

said control circuit feeding said value of the normalization factor calculated to said normalizing circuit;

said control circuit reading the image data representative of the single scene out of said first storage while delivering said image data to said orthogonal transforming circuit; causing said first storage, said orthogonal transforming circuit, said normalizing circuit, said coding circuit and said counter to execute the orthogonal transform, normalization and compression with the one scene of image data read out of said first storage; comparing the count output from said counter and a second target value, and repeatedly calculating the value of the normalization factor to thereby repeat the normalization, compression, counting of code and calculation of the normalization factor until said count satisfies said second target value within a preselected range.

2. A device in accordance with claim 1, wherein when the count output from said counter is greater than said first target value or said second target value, said control circuit calculates a first value of the normalization factor corresponding to said first target value in accordance with, among straight lines approximating the relation between the normalization factor and the quantity of code by log-log, a first line having a first slope, wherein when said count is smaller than said first target value or said second target value, said control circuit calculates a second value of the normalization factor corresponding to said first target value or said second target value in accordance with a second line having a second slope greater than said first slope, and wherein said control circuit feeds said first value or said second value to said normalizing circuit.

3. A device in accordance with claim 2, wherein said control circuit includes a second storage storing a default value of the normalization factor, and wherein said control circuit calculates a value of a scaling factor corresponding to said first line or said second line, reads the default value out of said second storage, and operates said default value with said value of the scaling factor to thereby produce said first and second values of the normalization factor.

4. A device in accordance with claim 3, wherein said control circuit operates, when operating said default value with said value of the scaling factor, said default value with a constant corresponding to said value of the scaling factor.

5. A method of controlling a quantity of codes representative of image data, comprising the steps of:

(a) thinning image data representative of a single scene to thereby output thinned image data, and subjecting said thinned image data to orthogonal transform to thereby generate transform coefficients;

(b) normalizing the transform coefficients in accordance with an initial value of a normalization factor to thereby output normalized transform coefficients;

(c) coding the normalized transform coefficients by compression to thereby output compressed data;

(d) counting a quantity of codes of the compressed data to thereby output a count; and (e) comparing the count and a first target value and calculating, based on a result of comparison, a value of the normalization factor corresponding to said first target value in accordance with a relation between the normalization factor and the quantity of codes;

(f) subjecting the image data representative of a single scene to orthogonal transform to thereby output transform coefficients;

(g) normalizing said transform coefficients produced in step (f) by said value of the normalization factor to thereby output normalized transform coefficients;

(h) coding the normalized transform coefficients output in step (g) by compression;

(i) counting a quantity of codes of said normalized coefficients output in step (g) to thereby output a count;

(j) comparing the count output in step (i) and a second target value and calculating, based on a result of comparison, a value of the normalization factor corresponding to said second target value in accordance with a relation between the normalization factor and the quantity of codes; and (k) repeating steps (g) through (j) until the count in said step (j) satisfies said second target value within a preselected range.

6. A method in accordance with claim 5, wherein step (e) comprises calculating, when the count output in step (d) is greater than said first target value, a first value of the normalization factor corresponding to said first target value in accordance with, among straight lines approximating the relation between the normalization factor and the quantity of code by log-log, a first line having a first slope, or calculating, when said count is smaller than said first target value, a second value of the normalization factor corresponding to said first target value in accordance with a second line having a second slope greater than said first slope, and wherein step (g) comprises normalizing the transform coefficients with said first value or said second value calculated.

7. A method in accordance with claim 6, step (j) comprises calculating, when the count output in step (i) is greater than said said second target value, a first value of the normalization factor corresponding to said second target value in accordance with, among straight lines approximating the relation between the normalization factor and the quantity of code by log-log, a first line having a first slope, or calculating, when said count is smaller than said second target value, a second value of the normalization factor corresponding to said second target value in accordance with a second line having a second slope greater than said first slope.

8. A method in accordance with claim 6, further comprising (l) preparing a default value of the normalization factor, wherein step (j) comprises calculating a value of the scaling factor in accordance with said first line or said second line, and operating said default value with said value of the scaling factor calculated to thereby output said first and second values of the normalization factor.

9. A method in accordance with claim 8, wherein step (j) includes operating, when operating said default value with said value of the scaling factor, said default value with a constant corresponding to said value of the scaling factor.

10. A method in accordance with claim 5, wherein said initial value of the normalization factor is selected such that the quantity of codes representative of the thinned image data exceeds said first value for image data representative of various kinds of general image patterns.

11. A method in accordance with claim 5, wherein said first value is a value converted for the thinned image data.

12. A method in accordance with claim 6, wherein said first and second values are substantially equal to −0.6 and −0.7, respectively.

13. A method in accordance with claim 5, wherein one pixel is sampled out of every four pixels in order to effect thinning.

14. A method in accordance with claim 13, wherein said first value is selected to be approximately equal to one-third of said second value.

* * * * *